United States Patent [19]

Fukasawa et al.

[11] 4,349,872
[45] Sep. 14, 1982

[54] INTERRUPT CONTROL SYSTEM

[75] Inventors: Sigeru Fukasawa, Hachiouji; Sadao Mizokawa, Hitachi, both of Japan

[73] Assignee: Hitachi, Ltd., Tokyo, Japan

[21] Appl. No.: 127,318

[22] Filed: Mar. 5, 1980

[30] Foreign Application Priority Data

Mar. 16, 1979 [JP] Japan .................................. 54-30015

[51] Int. Cl.³ .............................................. G06F 9/46
[52] U.S. Cl. .................................................. 364/200
[58] Field of Search ... 364/200 MS File, 900 MS File

[56] References Cited
PUBLICATIONS

Korn, Microprocessors and Small Digital Computer Systems, Coypright 1977, 1973 pp. 2, 141-150, 265-267.

Ralston, Encyclopedia of Computer Science Copyright 1976, pp. 199-200.

Primary Examiner—Gareth D. Shaw
Assistant Examiner—Stephen A. Soffen
Attorney, Agent, or Firm—Craig and Antonelli

[57] ABSTRACT

In an interrupt control system for a data processing unit for microprogram control including a processor constructed dividedly between an arithmetic unit and a control unit, a signal representing the absence or presence of an interrupt request to be performed is applied to the control unit so that said control unit reads a microprogram for the interrupt processing from a memory in response to said signal, and said arithmetic unit judges an interrupt source on the basis of the microprogram read out from said memory and performs processing in accordance with the interrupt source.

4 Claims, 8 Drawing Figures

INTERRUPT CONTROL SYSTEM

FIELD OF THE INVENTION

This invention relates to an interrupt control system and more specifically to an interrupt control system suited for a data processing unit constructed by the application of semiconductor integrated circuit techniques.

DESCRIPTION OF THE PRIOR ART

In constructing a central processing unit (CPU) such as a microcomputer by applying large scale integration (LSI) techniques to semiconductor chips, CPU-constituting elements are sometimes divided into several LSI chips due to limitations imposed on the density of integration of the LSI chips or on the number of pins for the interconnection with external circuits. Especially in the case of a 16-bit microcomputer used for various control purposes, a CPU is frequently formed by dividing its constituents into the following two LSI chips.

The first LSI chip is a portion which incorporates therein various registers and arithmetic and logic unit (ALU) for arithmetic operations and principally carries out a processing operation. The second LSI chip is a portion which plays the roles of decoding instructions, controlling its run sequence and also controlling interrupt and input and output.

In the present specification, the first and second LSI chips will hereinafter be referred to as an "arithmetic chip" and a "control chip", respectively. Incidentally, in a microprogram control system, read only memory (ROM) is assigned an LSI chip which is different from the abovementioned two LSI chips. In such a case, the CPU is constructed by three LSI chips in total.

FIG. 1 diagrammatically shows the construction of a microcomputer system as an example of the prior art which has the above-described CPU construction. In the drawing, reference numeral 1 is an arithmetic chip; 2 is a control chip; 3 is a ROM for storing the microprogram; 4 is a main memory for storing user program and data; and 5, 6 and 7 are external input/output terminal units. These elements are interconnected to each other by an information bus 8. An interrupt request from a terminal unit is applied as an input to the control chip 2 via a bus 9 and when the interrupt request is received, an interrupt-receiving signal is produced as an output from the control chip 2 via a bus 10 to the corresponding terminal unit 5, 6 or 7.

The system of interrupt routine that has been conventionally carried out in the control chip 2 when the abovementioned system configuration is used will be explained with reference to FIG. 2. The control chip 2 includes two kinds of interrupt registers (flip-flops) 11 and 12 whereby one 11 of them receives interrupt request signals REQ0–REQ3 from input/output units connected to devices outside the CPU that require masking while the other flip-flop 12 receives interrupt signals having higher priority that are produced inside the CPU, such as remote console request CI/O, stop request STOP REQ, power-down interrupt POP INT and so on, for example.

An external interrupt request of the flip-flop 11 is passed through AND gates 13a–13d whereby an AND operation is made between it and the content of an interrupt mask 14 forming part of a status register and a receivable interrupt request is applied as input to a priority judging circuit 15. On the other hand, a CPU internal interrupt request of the flip-flop 12 does not require masking so that it is directly applied as an input to the priority judging circuit 15.

Of the interrupt requests input to it, the priority judging circuit 15 selects the one having the highest priority and produces a signal 15s, which instructs the jump to a head address of interrupt judging routine, to an address generating circuit 16 of the microprogram. When the interrupt to be run is from outside the CPU, an acknowledge signal ACQ0–ACQ3 is produced as an output to the corresponding input/output unit.

However, the control chip requires a number of signal input/output pins in order to perform various functions such as reading of instruction words from the main memory and microinstruction from the ROM, for input and output control and other functions. If reception and acknowledgement of various interrupt requests are made by means of the control chip as in the conventional interrupt control system mentioned above, a large number of signal pins are used for the interrupt routine whereby addition of new functions to the control chip and extension of performance of the control chip becomes remarkably difficult due to the shortage of the signal pins.

It is desired, on the other hand, that the interrupt mask data should form a status register together with a condition code representing the result of logical operation. In the conventional interrupt control system such as described above, however, the interrupt mask is provided on the control chip whereas the condition code is provided on the arithmetic chip on account of their functions so that the status register is divided into two LSI chips and their control is complicated.

SUMMARY OF THE INVENTION

The present invention contemplates to solve the above-mentioned problems encountered in the prior art and is directed to provide an interrupt control system which reduces the number of signal pins for the interrupt routine and which is suited for an LSI data processing unit.

In order to accomplish this object, in an interrupt control system for a microprogram control data processing unit having its processor constructed dividedly by an arithmetic chip and a control chip, the present invention includes memory means for storing a microprogram for interrupt source-judging routine and interrupt source-processing routine, said means being interconnected with said arithmetic chip and with said control chip; and gate means for receiving interrupt request signals from plural interrupt sources having higher priority to a job being run in said arithmetic chip, and for producing as output one interrupt signal to be applied to said control chip; said control chip having access to the microprogram of the interrupt source-judging routine in response to the interrupt signal from said gate means; and said arithmetic chip judging the interrupt sources in accordance with the microprogram read out and performing the respective processing routine corresponding to the interrupt source.

In the control system in accordance with the present invention, an interrupt request signal from an input/output unit outside the CPU that requires masking in accordance with an interrupt level is input to the arithmetic chip and is subjected to masking by means of mask data of a status register. The arithmetic chip produces as an output a signal representing the absence or presence of an interrupt to be made on the basis of the masking result. This signal is applied as an input to an external OR gate together with a signal having the top priority interrupt level such as an internal interrupt of a CPU, the output of the OR gate being given as a signal representative of the absence or presence of the interrupt request to the control chip. Judgement of the interrupt sources is made at the arithmetic chip by sequentially taking in the interrupt request signals from inside the CPU having the abovementioned top priority levels by means of the microprogram for the interrupt routine, and then sequentially taking in the interrupt requests from the external input/output units.

These and other objects and features of the present invention will be made apparent from the following detailed description when read in conjunction with the accompanying drawings.

DESCRIPTION OF THE PREFERRED EMBODIMENT

Figure 1:
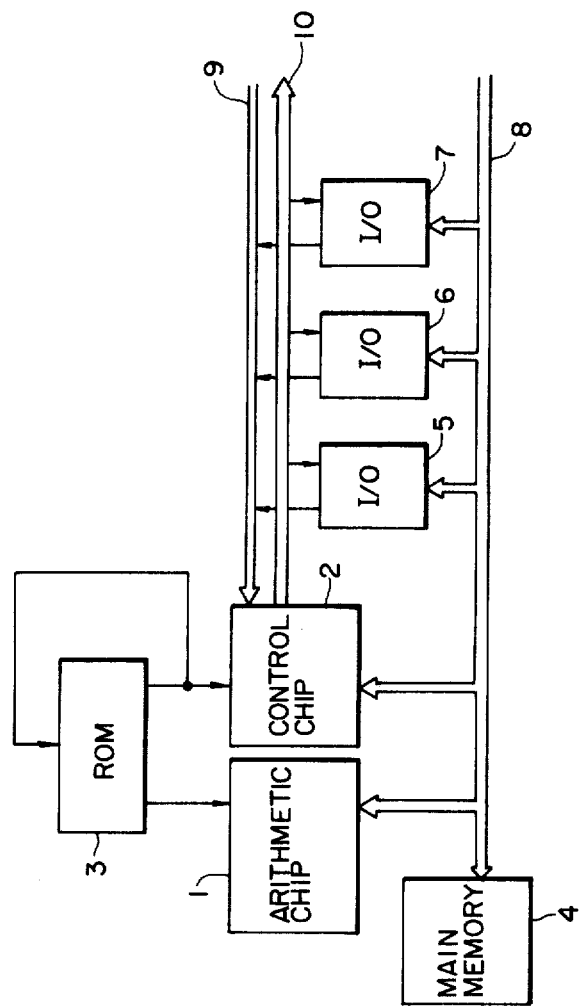
FIG. 1 is a block diagram showing the overall construction of the conventional LSI microcomputer.
Figure 2:
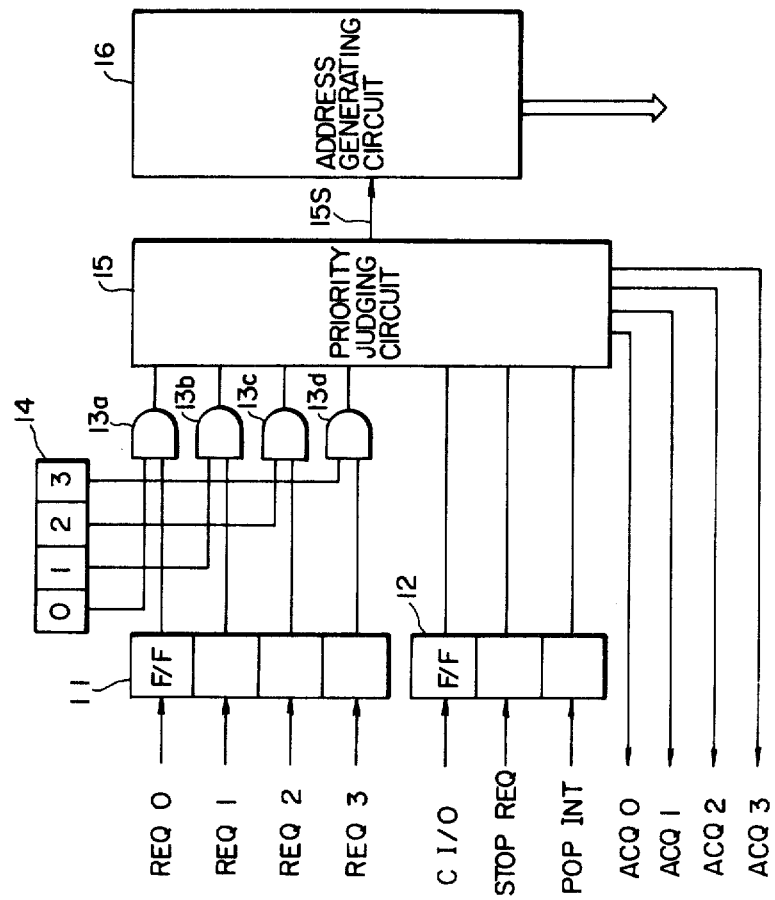
FIG. 2 is a chart useful for explaining the conventional interrupt control system used for the microcomputer having the abovementioned construction.
Figure 3:
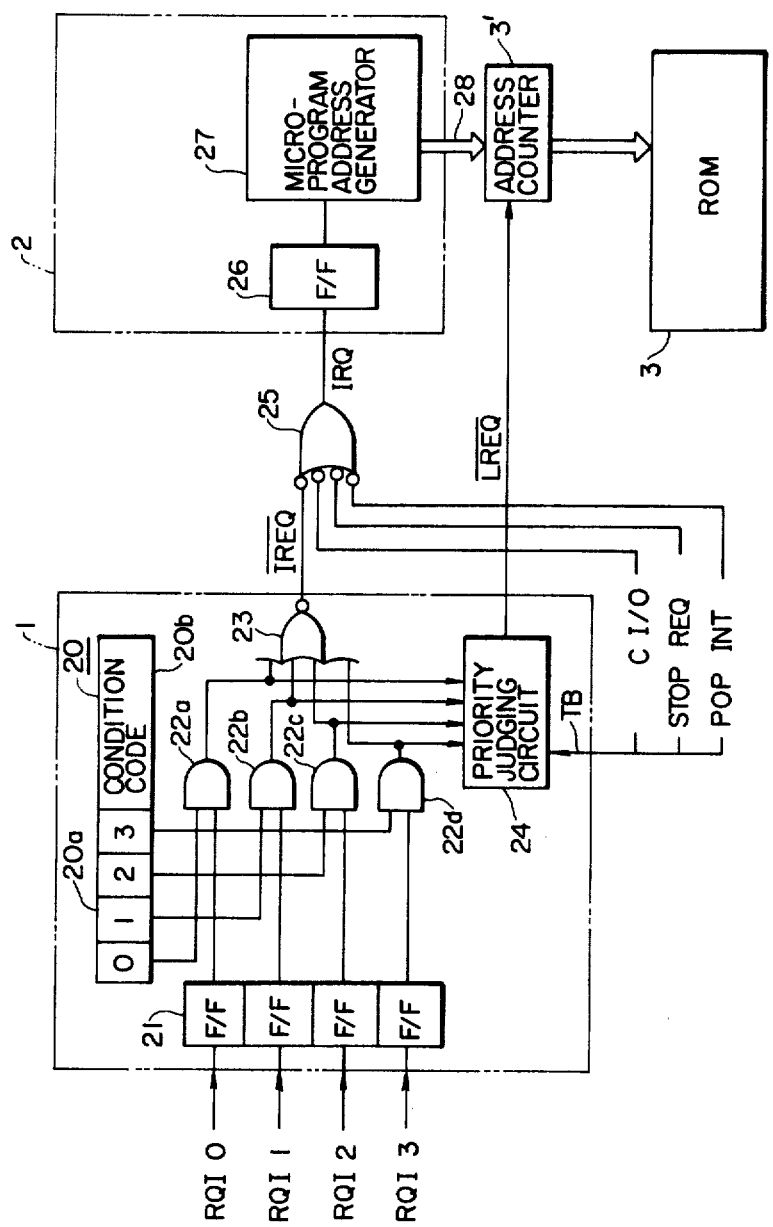
FIG. 3 is a chart useful for explaining the principle of the interrupt control system in accordance with the present invention.
Figure 4:
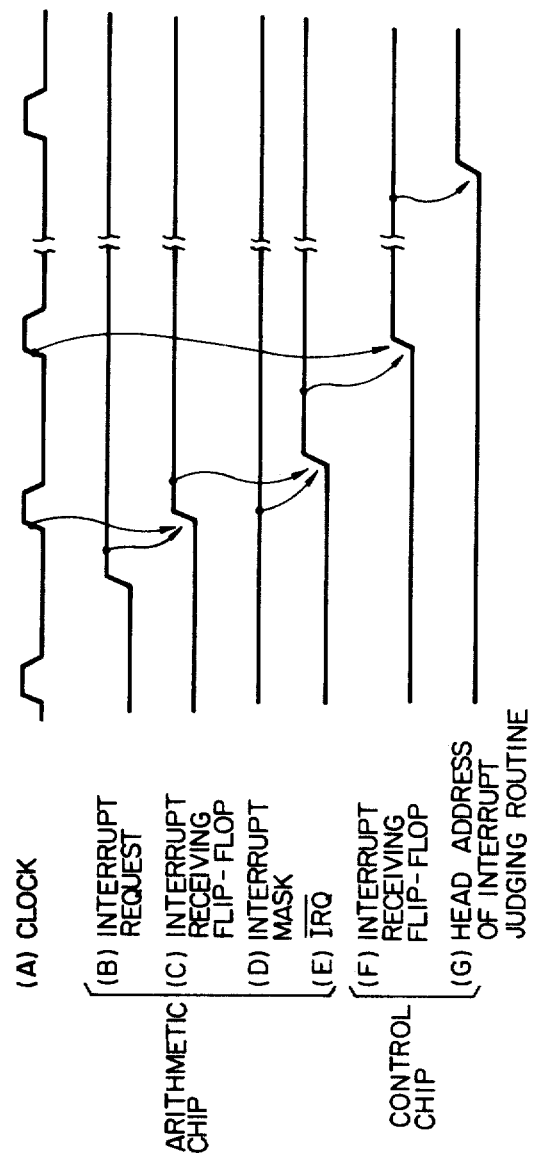
FIG. 4 is a time chart showing an example of the time chart of signals in the abovementioned interrupt control system.

FIG. 3 is a circuit diagram for explaining the principle of the present invention and FIG. 4 is a time chart of the signals in this circuit. The arithmetic chip 1 incorporates therein a status register 20 including mask data 20a and condition code 20b, and a flip-flop 21 for receiving as an input the interrupt request signals from the external input/output units at each level. The external interrupt request signals RQI0-RQI3 are sampled by clock signals of the arithmetic chip every one micro-cycle, are applied as an input to the interrupt-receiving flip-flop 21 and are then subjected to AND operation between them and the abovementioned mask data 20a at AND gates 22a-22d at each interrupt level. The output of the AND gates 22a-22d is then passed through an OR gate 23 to determine the logical OR and its result is produced from the arithmetic chip 1 as the output signal $\overline{IREQ}$. In other words, the arithmetic chip 1 produces as its output the signal $\overline{IREQ}$ which represents the absence or presence of the external interrupt request.

The abovementioned signal $\overline{IREQ}$ is input to an OR gate 25 outside the LSI chip together with interrupt request signals from inside the CPU that are to be received with higher priority, and the output of this OR gate is input to a signal pin IRQ of the control chip 2 for receiving an interrupt input.

Examples of the internal interrupt request signals of the CPU include internal interrupt request from the console C I/O, stop interrupt request STOP INT and power-down interrupt request POP INT, for example.

The control chip 2 samples the interrupt request signals IRQ from the abovementioned OR gate 25 by means of its internal clocks and takes them into the interrupt-receiving circuit incorporated therein such as a flip-flop 26, for example. As a result, it receives a request, if any, at the timing of the interval of the instruction which is being run, produces from a microprogram address-generating circuit 27 a ROM address 28 representing the head of the interrupt routine program and applies it to an address counter 3'.

Figure 5:
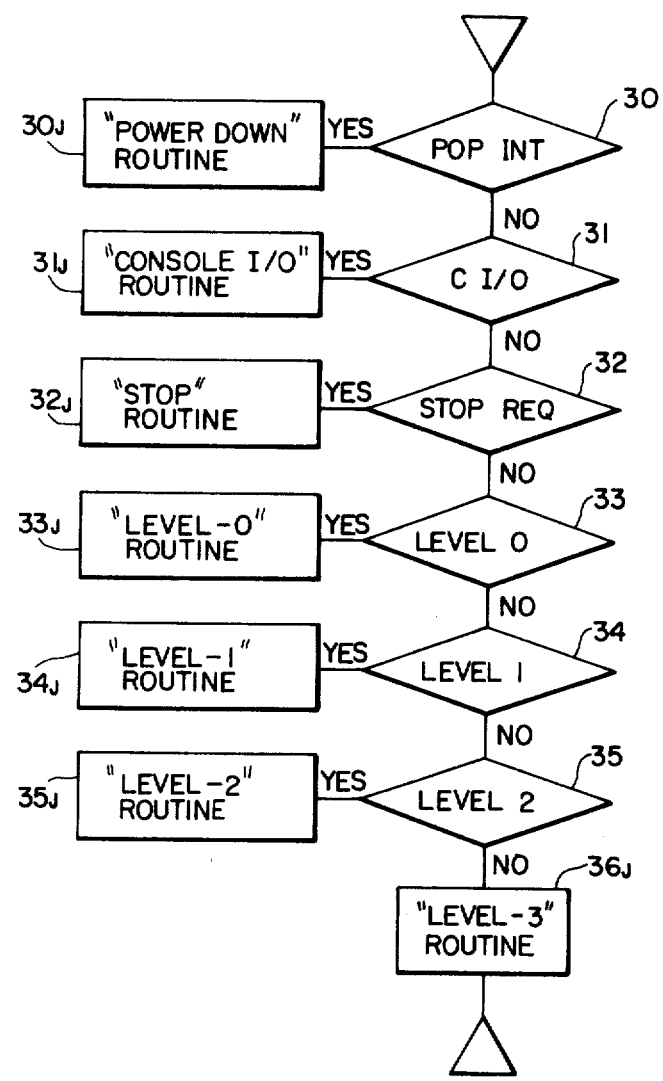
FIG. 5 is a diagrammatic flow chart of a microprogram for the interrupt routine.

The interrupt processing program of ROM 3 is programmed in micro instruction language, as represented by 30-35 in FIG. 5, so as to judge the interrupt sources in accordance with priority and to perform the processing routines 30J-36J corresponding to the respective interrupt sources.

In the running process of the abovementioned interrupt processing program, the arithmetic chip 1 performs its control function in such a fashion that it sequentially takes the internal interrupt signals of the CPU, that is, the conditions of C I/O, STOP REQ and POP INT, from the terminal TB into a priority-judging circuit 24 and if there is no interrupt request among them, it then takes the output signals of the AND gates 22a-22d into the priority-judging circuit 24. When detecting an interrupt source, the priority-judging circuit 24 outputs a signal $\overline{LREQ}$ to the address counter 3'. The address counter 3' is response to the abovementioned signal $\overline{LREQ}$ to perform an incremental action or a load action, loads the address 28 from the circuit 27 when the signal is fed thereto and jumps it to the predetermined processing routine 30-36J.

Next, an embodiment of the microcomputer employing the interrupt control system in accordance with the present invention will be explained with reference to FIGS. 6-8.

Figure 6:
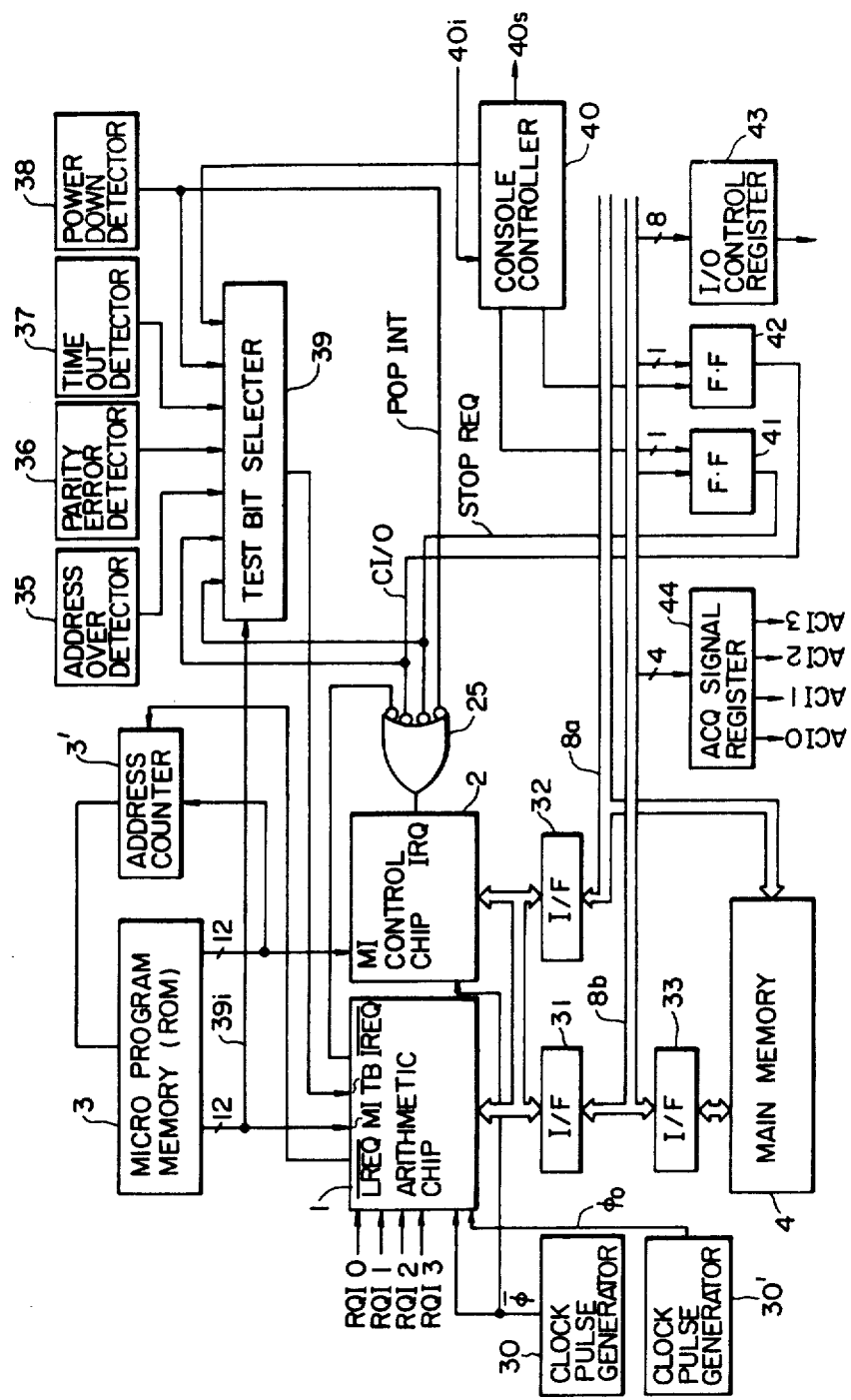
FIG. 6 is a block diagram showing the overall construction of the CPU portion of a microcomputer in an embodiment of the present invention.

FIG. 6 shows the overall construction of the CPU board which includes the arithmetic chip 1, the control chip 2, the ROM chip 3 for storing the microprogram, the ROM address counter 3' and the main memory 4 for storing the program. Reference numerals 30 and 30' represent clock pulse generators, respectively, that produce as their output fundamental clocks required for the arithmetic chip, the control chip and other circuit elements. Reference numeral 8a represents an address bus and 8b a data bus. The arithmetic chip 1, the control chip 2 and the main memory 4 are interconnected to the address bus or to the data bus through the intermediary of interface circuits 31, 32, 33, respectively.

Reference numeral 35 represents an address over detecting circuit; 36 is a parity error detecting circuit; 37 is a time-out detecting circuit and 38 is a power-off detecting circuit. The output signals from these detecting circuits are applied as input to a test bit selector 39.

Reference numeral 40 represents a console controlling circuit which produces, as its output, interrupt request signals to a STOP flip-flop 41 and to a C I/O flip-flop 42 in response to the input signal 40i from the console and also produces as output a data representing signal 40s to the console. Reference numeral 43 represents an input/output control register and 44 a register for storing an acknowledge signal to the external input or output device which generates the interrupt request.

In the system described above, machine instructions and data, that form the user program stored in the main memory 4, are read out in accordance with the address generated as an output from the control chip 2 and are taken into the chips 1 and 2 via the interfaces 33 and 31. The control chip 2 decodes the machine instruction and gives the ROM address from the terminal MI to the ROM address counter 3' to read out the corresponding microprogram. The microinstruction read out from ROM 3 is input to the arithmetic chip 1 and to the control chip 2 through their MI terminals and controls the operation inside each chip.

The interrupt request signals RQI0–RQI3 from the external input/output units are masked at the arithmetic chip 1, which produces a signal $\overline{IREQ}$ and outputs it to the OR gate 25. On the other hand, STOP REQ, C I/O and POP INT as the internal interrupt request signals from inside the CPU are output from the flip-flops 41, 42 and from the power-off detecting circuit 38 and are input to the above-mentioned OR gate 25.

When the interrupt request signal IRQ from the abovementioned OR gate 25 is taken into the control chip 2, the microinstructions for the interrupt processing program are sequentially read out from ROM 3. The microinstruction for determining whether or not a given interrupt request is from inside the CPU produces a selection signal and applies it to the test bit selector 39 through a signal line 39i. Since the internal interrupt signals STOP REQ, C I/O and POP INT each are one of the input signals of the test bit selector 39, they are sequentially input to the arithmetic chip 1 in accordance with the microinstruction read out from ROM 3.

In this embodiment, the interrupt acknowledegment to the external input/output units is made from a register 44 in order to restrict the increase in the number of signal pins for the purpose of processing the interrupt at the arithmetic chip 1. When the external interrupt request is received, the operand "1" is set to the bit corresponding to the interrupt of the register 44 by means of the microinstruction of the interrupt processing program, and "0" is set to the bit when the interrupt routine is completed.

Figure 7:
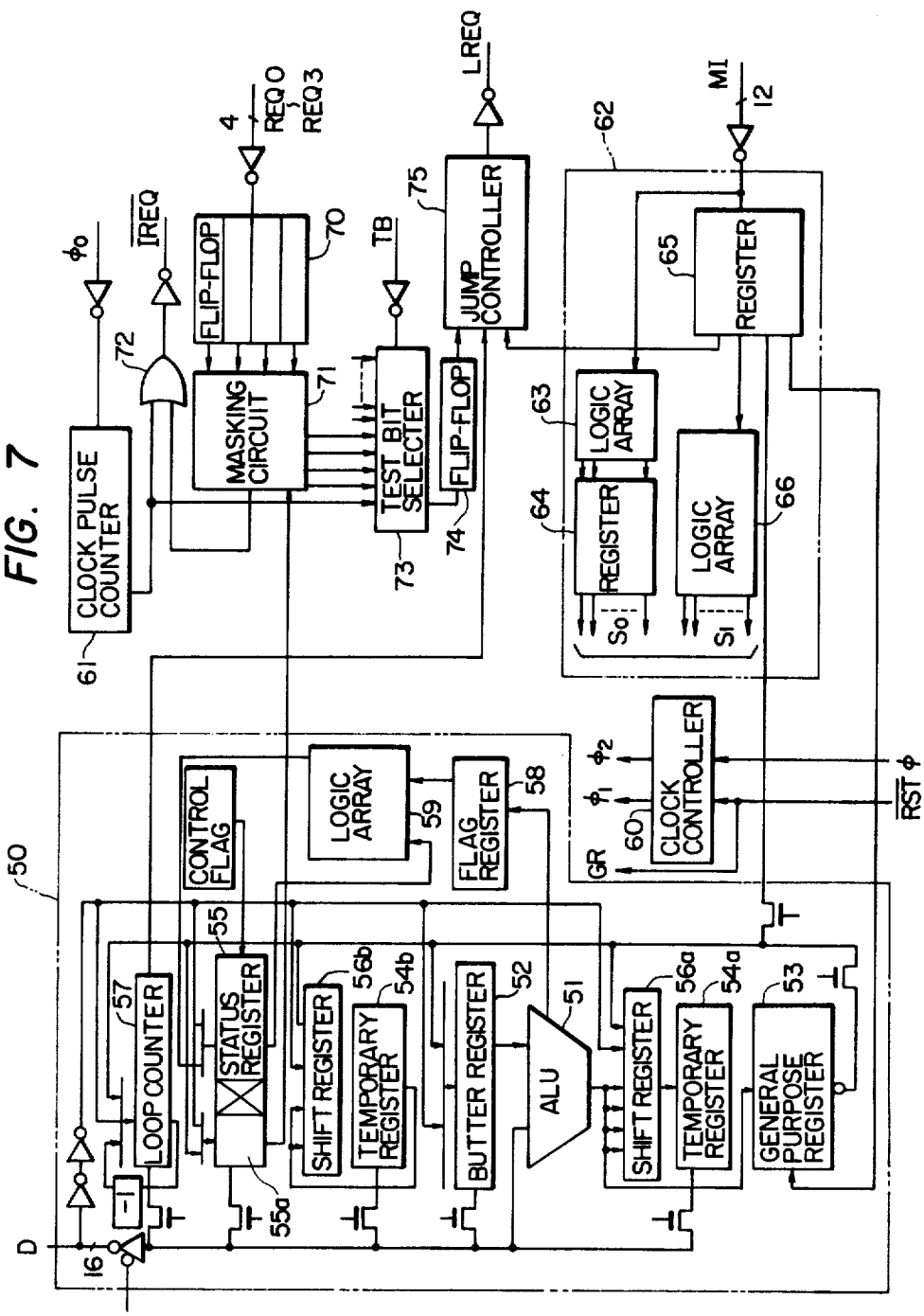
FIG. 7 is a block diagram showing the construction of the arithmetic chip.

FIG. 7 shows the internal construction of the abovementioned arithmetic chip 1. Its principal portion is a data construction portion 50, which consists of an ALU 51, a buffer register 52, a general purpose register 53, a temporary register 54a, a temporary register for extension 54b, a status register 55, shift registers 56a, 56b, a loop counter 57, a flag register 58 and a logic array 59, all being the elements required for the data operation.

In addition to these elements, the arithmetic chip 1 further includes a clock control circuit 60 for generating internal clocks by means of clock pulses given from the outside and of reset signals $\overline{RST}$, a counter circuit 61 for counting the clock pulses $\phi_0$ and producing the timing pulses and a decoder circuit 62 for decoding the microinstruction MI and producing various control signals for LSI internal circuits as its output. In this embodiment, the decoder circuit 62 consists of two portions whereby the first portion comprises a programmable logic array (PLA) 63 for immediately decoding the fetched microinstruction and producing a control signal $S_o$ at a quick timing and a register 64 while the second portion comprises a register 65 and PLA 66 for producing a control signal $S_1$ at a timing slower than the abovementioned signal $S_o$. The former control signal $S_o$ includes, for example, a signal designating a register as the object of the logical operation and the latter $S_1$ includes, for example, a signal designating a register for storing the result of the logical operation by ALU 51.

The external interrupt request signals REQ0–REQ3 are taken into an interrupt flip-flop 70 and are masked in a masking circuit 71 consisting of the AND gate and the OR gate that have been explained with reference to FIG. 3. To this masking circuit 71 is supplied mask data from the mask data portion 55a of the status register 55 and if the interrupt request is a receivable interrupt request, a signal $\overline{IREQ}$ is produced as an output outside LSI through the OR gate 72. The OR gate 72 also produces, as the signal $\overline{IREQ}$, a timer interrupt request signal to be produced from the counter circuit 61.

Reference numeral 73 represents a test bit selector circuit for judging the absence or presence of an interrupt request which selectively outputs any of various input signals in accordance with the microinstruction to a test flip-flop 74. The input signals include bit signals TB from inside CPU, and bit signals corresponding to the external interrupt request signals REQ0–REQ3 given from the masking circuit 73. As explained already, in the running process of the interrupt routine program, a bit signal representing the interrupt request is selected from the selector circuit 73 and when it corresponds to the interrupt source, a signal LREQ is produced from a jump control circuit 75.

Figure 8:
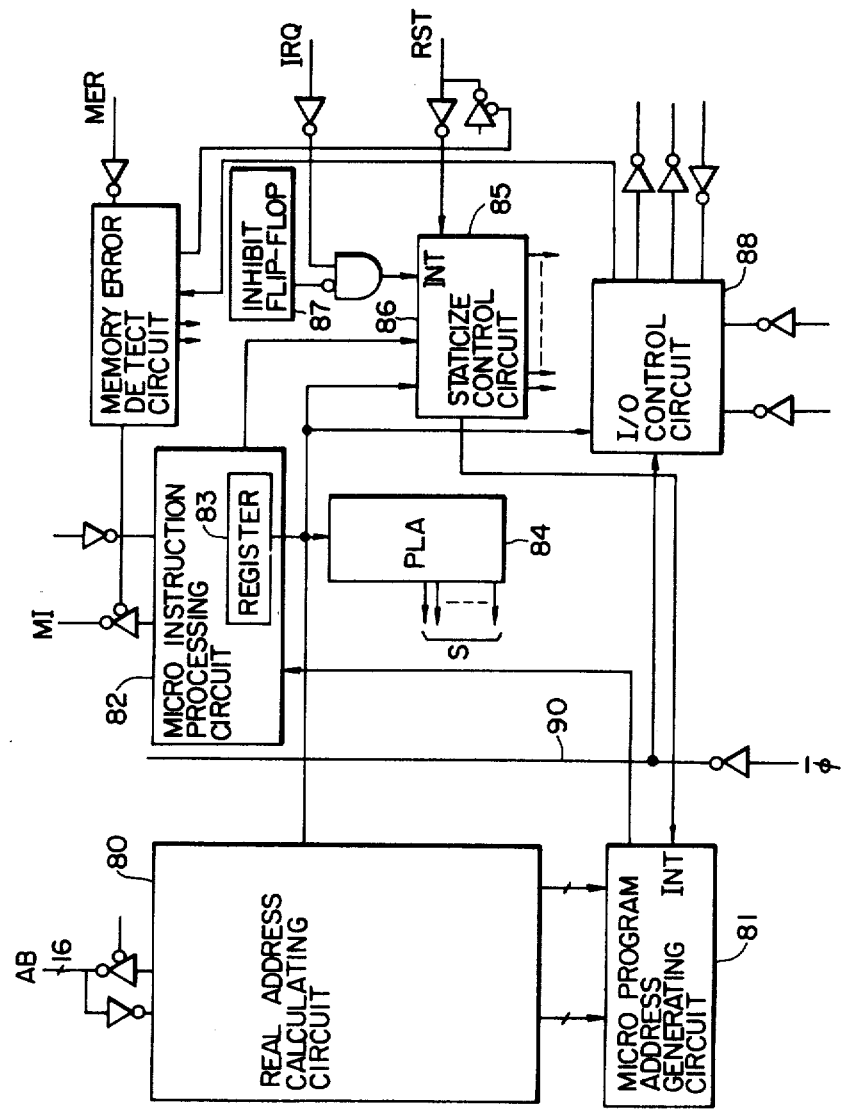
FIG. 8 is a block diagram showing the construction of the control chip.

FIG. 8 diagrammatically shows the internal construction of the control chip 2. The control chip 2 includes a real address calculating circuit 80 of the main memory 4, an address generating circuit 81 for designating the address of the microprogram of ROM 3, a microinstruction processing circuit 82 and a clock bus 90. The real address calculating circuit 80 has various registers such as memory registers and program counters, takes thereinto the machine instruction on the main memory designated by the program counter through a bidirectional bus AB and calculates the real address for data reading. The address generating circuit 81 generates the head address of the microprogram for performing the machine instruction which is taken into the real address calculating circuit 80. This address is given to the microinstruction processing unit 82 and is output to a bidirectional bus MI connected to ROM 3 as well as to the ROM address counter 3'. The microinstruction processing circuit 82 has a register 83 for storing the microinstruction read out from ROM and the microinstruction taken into this register is decoded and converted into an operation control signal S for the control chip by means of PLA 84.

Reference numeral 85 represents a circuit (staticizing circuit) for controlling the read-out operation of the instruction from the main memory and the performance of the decoding operation of the instruction. When it is input with an interrupt signal INT, the circuit gives a signal to the address generating circuit 81 so that it generates the head address of the interrupt program. The interrupt signal IRQ from the OR gate 25 disposed outside the control chip is input to the abovementioned staticizing circuit through the AND gate 86, which is subject to the conductivity control by means of an interrupt-inhibiting flip-flop 87. Reference numeral 88 represents an input/output control circuit. Since this circuit has nothing to do directly with the gist of the invention, the explanation of this circuit is hereby omitted.

As can be appreciated from the foregoing explanation, in accordance with the present invention, the interrupt request of the top priority which does not require masking is first subjected to the AND operation outside both chips and is then applied as an input to the control chip so that the interrupt signal input pins have only to be allotted to the interrupt requests of lower order of priority which need masking. It is therefore possible to reduce the number of the interrupt processing pins in the LSI chips as a whole. The present invention uses the system in which the acknowledgement to an input/output device requesting the interrupt is made through the register disposed outside the LSI chips so that the acknowledgement data is given to this register by means of the microprogram control through the intermediary of the data bus. Accordingly, it is also possible to further reduce the number of the interrupt control pins on the arithmetic chip. Thus, the interrupt control system in accordance with the present invention is extremely effective for the large scale integration of CPU of a data processing unit.

What is claimed is:

1. A data processing system under microinstruction control comprising:

memory means for storing microinstruction sequences including an interrupt processing sequence comprising a first routine and a plurality of second routines, said first routine sequentially specifying polling of each of a plurality of first interrupt requests and each of a plurality of second interrupt requests in a predetermined order, and said second routines each specifying a processing of a respective one of said first and second interrupt requests;

a plurality of first means each for generating one of said first interrupt requests;

a plurality of second means each for generating one of said second interrupt requests;

executing means provided on an integrated circuit chip including receiving means for receiving said second interrupt requests in parallel from said second means, status register means for manifesting mask bits, and gate means including a plurality of gates each connected to said receiving means and said status register means for masking one of said received second interrupt requests in response to a corresponding one of said mask bits;

OR gate means for providing a single interrupt request signal in response to any of said first interrupt requests provided by said first means and in response to any of said masked interrupt requests provided by said gate means;

control means formed on an integrated circuit chip for providing an initial address of said first routine to said memory means in response to said single interrupt request signal in order to initiate said first routine thereby; and means connected to said gate means and said first means for generating a jump signal and applying said jump signal to said memory means during the polling of said first and second interrupt requests by said first routine when a specified interrupt request is provided thereto, said jump signal ordering said memory means to jump to the one of said second routines corresponding to the specified interrupt request;

wherein said OR gate means comprises first and second OR gate means, said first OR gate means being provided outside of said integrated circuit chip on which said executing means is provided and outside of said integrated circuit chip on which said control means is provided, said second OR gate means being provided within the same integrated circuit chip as said executing means, said first OR gate means being responsive to any of said generated first interrupt requests, said second OR gate means being responsive to any of said masked second interrupt requests, and said first and second OR gate means being mutually connected so that each of the outputs thereof is provided to said control means as said single interrupt request signal via a common signal line.

2. A data processing system according to claim 1, wherein said executing means and said control means are formed on different integrated circuit chips and said first and second OR gate means are connected so that output of said second OR gate means is provided as one of the inputs of said first OR gate means, and said output of said first OR gate means is provided to said control means as said single interrupt request signal via said common signal line.

3. A data processing system according to claims 1 or 2, wherein said jump signal generating means comprises:

third means provided outside of said intergrated circuit chip on which said executing means is provided, for selectively transferring one output of said first means in response to the polling of each of said first interrupt requests by said first routine when said first routine specifies one of said first interrupt requests; and judging means provided within the same integrated circuit chip as said executing means and connected to receive said masked second interrupt requests in parallel and to receive said selectively transferred output of said third means, said judging means providing said jump signal when one of said first interrupt requests which said first routine specifies is provided thereto as said selectively-transferred output or when one of said second interrupt requests which said first routine specifies is provided thereto as one of said masked second interrupt requests.

4. A data processing system under microinstruction control comprising:

memory means for storing microinstruction sequences including an interrupt processing sequence comprising a first routine and a plurality of second routines, said first routine sequentially specifying polling of each of first interrupt requests and each of second interrupt requests in a predetermined order, and said second routines each specifying a processing of a respective one of said first and second interrupt requests;

a plurality of first means each for generating one of said first interrupt requests;

a plurality of second means each for generating one of said second interrupt requests;

executing means formed on an integrated circuit chip, including receiving means for receiving said second interrupt requests in parallel from said second means, including status register means for manifesting mask bits, a plurality of gate means for masking one of said received second interrupt requests in response to corresponding one of said mask bits;

OR gate means for generating a single interrupt request in response to any of said first interrupt requests provided in parallel from said first means and in response to any of said masked second interrupt requests provided in parallel from said receiving means;

control means for providing an initial address of said first routine to said memory means in response to said single interrupt request in order to initiate said first routine thereby;

means for selectively transferring one of the outputs of said first means in response to sequential polling by said first routine; and judging means provided within the same integrated circuit chip as said executing means and connected to receive said masked second interrupt requests in parallel and to receive said selectively-transferred output of said third means, said judging means providing a jump signal to said memory means when one of said first interrupt requests which said first routine specifies is provided thereto as said selectively transferred output or when one of said second interrupt requests which said first routine specifies is provided thereto as one of said masked second interrupt requests, said jump signal ordering said memory means to jump to one of said second routines.

* * * * *